United States Patent [19]

Zimmermann

[11] Patent Number: 4,648,535

[45] Date of Patent: Mar. 10, 1987

[54] INSULATING JUG OF WHICH THE OPENING IS CLOSABLE BY A CLOSURE MEMBER

[75] Inventor: Anzo Zimmermann, Bad Hersfeld, Fed. Rep. of Germany

[73] Assignee: Rotpunkt Dr. Anso Zimmermann, Niederaula, Fed. Rep. of Germany

[21] Appl. No.: 669,616

[22] Filed: Nov. 8, 1984

[30] Foreign Application Priority Data

Nov. 23, 1983 [DE] Fed. Rep. of Germany ....... 3342356
Jan. 27, 1984 [DE] Fed. Rep. of Germany ....... 3402894
Apr. 2, 1984 [DE] Fed. Rep. of Germany ....... 3412210

[51] Int. Cl.⁴ .................. A47G 19/4; B65D 47/20; B67D 3/00
[52] U.S. Cl. .................................. 222/472; 222/509; 222/518; 222/545
[58] Field of Search .............. 222/472, 509, 518, 545, 222/510, 505, 511, 546; 251/232, 246

[56] References Cited

U.S. PATENT DOCUMENTS

| | | | |
|---|---|---|---|
| 418,774 | 1/1890 | Wagner, Jr. | 251/246 X |
| 599,389 | 2/1898 | Jackson | 222/509 X |
| 1,040,991 | 10/1912 | Avram | 222/505 X |
| 1,216,963 | 2/1917 | Dodd | 251/246 |
| 1,380,973 | 6/1921 | Kelsea | 222/509 |
| 2,038,356 | 4/1936 | Hall, Jr. | 222/472 X |
| 2,143,250 | 1/1939 | Ritter | 222/518 X |
| 2,795,391 | 6/1957 | Krone et al. | 251/232 X |
| 2,830,786 | 4/1958 | Mahoney | 251/246 X |
| 2,987,224 | 6/1961 | Chapman | 222/472 X |
| 3,419,187 | 12/1968 | Bazarnic | 222/509 X |
| 4,136,799 | 1/1979 | Albert | 222/518 X |

FOREIGN PATENT DOCUMENTS

| | | |
|---|---|---|
| 2152725 | 4/1973 | Fed. Rep. of Germany. |
| 8314500 | 10/1983 | Fed. Rep. of Germany. |
| 463841 | 4/1937 | United Kingdom ............... 251/246 |
| 1339005 | 11/1973 | United Kingdom. |

*Primary Examiner*—Joseph J. Rolla
*Assistant Examiner*—Nils Pedersen
*Attorney, Agent, or Firm*—Scully, Scott, Murphy & Presser

[57] ABSTRACT

The invention relates to an insulating jug (1) having a housing (2) with a handle (4) or like grip formed thereon and a cap (5) and a pouring opening (6) closable by a closure member (9) movable vertically between a closed and an open position by a displacement mechanism (11) with an operating member extending through the cap. The object of the invention is to improve the insulating jug so that it can be opened and closed by a simple operation with one hand, and so that improper handling is avoided. This is achieved in that the closure member (9) is pre-tensioned in the direction (30) of the closed position by the force of a spring (18), and can be held in the open position against the force of the spring (18) by the displacement mechanism (11), in that the operating member (38) of the displacement mechanism (11) is automatically restored to its closed position by the spring (18), and in that the operating member (38) extends to within finger reach of the handle (4).

13 Claims, 7 Drawing Figures

INSULATING JUG OF WHICH THE OPENING IS CLOSABLE BY A CLOSURE MEMBER

TECHNICAL FIELD OF THE INVENTION

The invention relates to an insulating jug according to the preamble of claim 1.

BRIEF DESCRIPTION OF THE PRIOR ART

An insulating jug of this type is described and illustrated in German OLS No. 2,152,725. In this known insulating jug the opening is provided with a closure member that is movable between a closed and an open position by means of a threaded spindle having a rotating knob outside the cap.

To close the opening of the known insulating jug requires a rather uncomfortable operation of the rotating knob. Furthermore, because of the spindle mechanism, by which relatively large forces can be transmitted, the possibility cannot be excluded of improper treatment by overloading which can lead to damage of the sealing surfaces of the closure, or of the control screw.

OBJECT OF THE INVENTION

The problem underlying the invention is to improve an insulating jug of the present type so that it is possible to open and close the opening by a simple operation with one hand and without the risk of improper treatment.

BRIEF DESCRIPTION OF THE INVENTION

This problem is solved by the characteristic features of claim 1.

With this solution the closure of the opening takes place automatically through a spring force whose magnitude can be pre-set and is then always the same. In the pre-setting the properties of the materials used, the desired surface pressure at the closure and any expected steam pressure can be taken into account, so that the force with which the closure member closes the opening can be made optimal. The closure member is restored automatically to its closed position by the spring, so that no manual movement of the closure member to its closed position is required. If need be, however, it is possible to consider cutting out the automatic movement of the closure member into its closed position.

A further important advantage of the design according to the invention is that the opening can be opened and closed with one hand, namely the hand that is holding the insulating jug for pouring. This is possible since the operating member extends to within finger reach of the handle. The operating member can, therefore, be operated with one finger of the operating hand, for example the thumb, in a simple and convenient manner.

The design according to claim 2 is constructionally simple and advantageous. It enables the opening to be closed in a simple manner, for example by pressing the closure member onto the rim of the opening.

If the closure member cooperates with the opening of the insulating jug, which is also the filling opening, then the construction of the insulating jug may give rise to difficulties on pouring the liquid out, caused by the fact that the liquid has to flow through a narrow crescent-shaped cap and, therefore, undesired turbulence of the liquid as it flows out cannot be excluded. In the design according to claim 3 such undesired turbulence is prevented, since the special pouring channel in the cap enables the liquid to flow out smoothly. It is also possible to specifically predetermine the, e.g. circular, section of the pouring channel so that on pouring a controlled amount of the liquid flows out. This also is important for the prevention of turbulent flow on pouring. It is also advantageous to arrange the opening of the pouring channel from the interior of the jug close to the rim of the opening, i.e. on the side facing away from the handle and towards the pourer, so that the residual liquid can more easily be poured out of the jug. Within the scope of the invention it is also possible to direct the closure movement of the closure member vertically downwards. Such a design is possible if the closure member is arranged in a hollow cap and can be displaced against the bottom of the cap to seal the pouring channel.

The design according to claim 5 is also constructionally desirable. It makes possible a simple construction and operation of the closure member in which the spring is arranged out of sight in the space inside the cap. In such an arrangement it is advantageous to connect the closure member with the stem so that it can be rotated about its axis and is preferably removable. The possibility of rotation is of particular advantage for a screw cap, since on screwing up the cap and contact of the closure member with the rim of the opening, the closure member must not participate in the rotation of the cap. Otherwise the closure member would have to slide on the rim of the opening.

If the operating member of the displacement mechanism is brought sideways out of the cap according to claim 6, it can be led in a simple manner to a position directly above the handle, where it can be reached very conveniently by a finger of the operating hand, for example the thumb.

It is, however, also possible to arrange the operating member according to claim 7 on top of the cap on the side facing the handle. In such a design also the operating member can conveniently be reached by a finger of the operating hand.

The designs according to claims 8 to 10 provide simple embodiments of a displacement mechanism that enable forces to be transmitted in a simple manner and thus also contribute to ease of operation. Thus, according to the invention, a lever can both be mounted on the side of the cap facing away from the handle as a single-armed lever and also on the side of the lid facing the handle as a two-armed lever. The direction of closure of the closure member must here be taken into account. Solutions can also be realized in which, according to claim 10, two levers cooperate. In such a design the direction of operation can be changed and mounting points for one of these two levers can be on the side of the cap remote from the handle.

In the construction of claim 11, the ring seal is loaded by the spring force. This leads to an improved sealing in two respects, since both the axial and the radial sealing effect of the ring seal are improved by the spring force because of increased tension.

BRIEF DESCRIPTION OF THE DRAWINGS

Three exemplary embodiments of the invention will now be described with reference to a simplified drawing in which.

DETAILED DESCRIPTION OF THE PREFERRED EMBODIMENTS OF THE INVENTION

Figure 1:
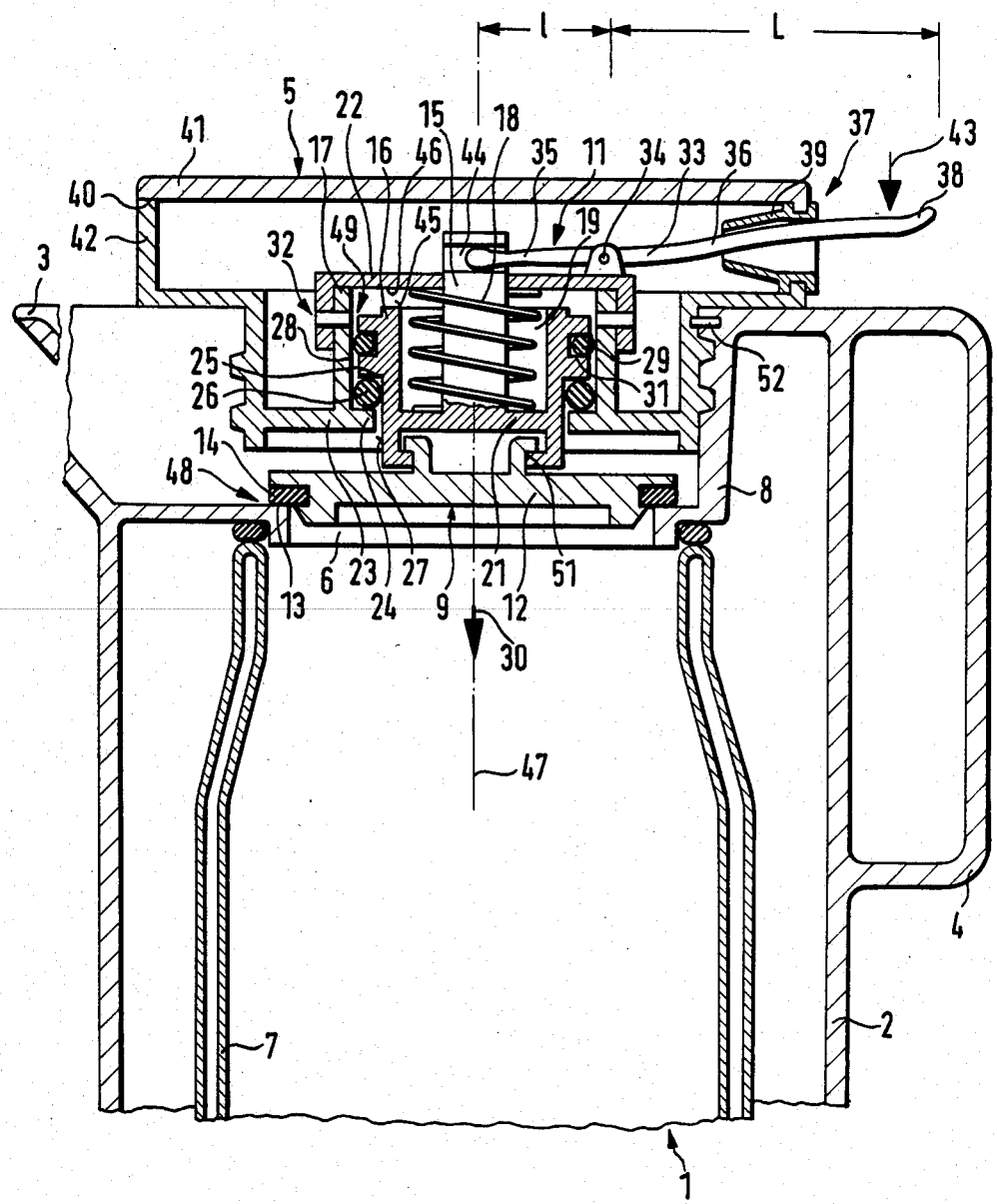
FIG. 1 shows an insulating jug in vertical section as a first embodiment.

In each of the three embodiments given as examples there is an insulating jug indicated generally by 1, having a protective casing 2 on which a pourer 3 and a handle 4 are integrally formed, with a cap 5 by which an opening 6 can be closed and with an insulating insert 7 which is tensioned in known manner so as to be sealed against the underside of a connecting piece 8 of the protective casing 2.

In the first embodiment according to FIG. 1, the cap 5 is a so-called screw cap which can be screwed into the connecting piece 8 from above. In the position shown the opening 6 is closed by a closure member 9 which is guided vertically in the cap 5 and can be displaced between the closed position shown and an open position by a displacement mechanism indicated generally by 11. The closure member 9 consists of a valve plate 12 which carries a flat seal 14 cooperating with the rim of the opening 13 and a stem 15 which is guided indirectly by a guide ring 16 surrounding it so as to be vertically displaceable in an outer guide cylinder 17 in the side of the cap.

The closure member 9 is pre-tensioned in the direction towards the rim of the opening 13 by a pressure spring 18 arranged in a space 19 between the stem 15 and the guide ring 16 to abut on the closure member side against a base 21 of the stem 15 and on the cap side against an abutment 22. The opening movement of the closure member 9 is limited by a stop 24 formed from the cap bottom 23 which cooperates with a shoulder 25 of the guide ring 16. Between the stop 24 and the guide 25 is a ring seal 26 which contacts with its inner circumference a cylindrical surface 27 of the guide ring 16 and with its outer circumference the guide surface 28 of the guide cylinder 17 in the side of the cap. In the opened position of the closure member 9 which occurs when the lid 5 is unscrewed, the ring seal 26 is compressed by the force of the pressure spring 18 so that in this position the sealing of the closure member is increased.

A second ring seal 29 can additionally be provided, arranged in an annular groove 31 in the guide ring 16 and fitting against the guide surface 28 of the guide cylinder 17 in the side of the cap.

The abutment 22 for the pressure spring 18 annularly embraces the guide cylinder 17 and can be fixed to the guide cylinder 17 by a bayonet connection 32 which is indicated by two rods. The abutment 22 lies on the front face of the guide cylinder 17.

The displacement mechanism indicated generally by 11 consists of a two-armed lever 33 which is pivotably mounted in a mounting 34 projecting from the abutment 22 and has a short arm 35 acting on the stem 15 of the closure member 9 and a long arm 36 which passes through a lateral opening 37 in the cap 5 and forms with its end which projects from the cap 5 an operating member 38. A sealing sleeve 39 is arranged around the arm 36 in the opening 37. The ratio of the length of the lever arms L:1=about 3:1.

To facilitate the installation of the displacement mechanism 11, the cap 5 consists of an upper cap part 41 and a lower part 42 which are sealed together in a manner not shown, e.g. stuck, locked or welded. The joint 40 runs through the opening 37.

To pour liquid out of the insulating jug 1 requires pressure on the operating member 38 in the direction of the arrow 43. The closure member 9 is thus moved upwards contrary to its closure direction 30 by the action of the short arm 35 which extends into a slot 44 in the stem 15, until the upper side 45 of the guide ring 16 comes into contact with the lower side 46 of the abutment 22. The pressure on the operating member 38 must be maintained as long as pouring is to continue, and this can be easily and conveniently done by the thumb of the hand that is holding the handle 4. As soon as the operating member 38 is released, the closure member 9 automatically closes the opening 6 since it is depressed by the force of the pressure spring 18 so that the sealing surfaces 48 which are substantially at right angles to the central axis 47 meet the rim 13 of the opening and the flat seal 14. The pressure spring 18 is pre-tensioned, having regard to the properties of the materials, to such an extent that the closure member 9 remains closed under the steam pressure expected when filling with hot liquids.

The closure member 9 can rotate freely around the middle axis 47 of the cap 5 and the insulating jug 1 in its vertical guide, indicated generally by 49, or because of a form-locking connection 51 between the stem 15 and the valve plate 12, which may be lockable. The closure member 9 can, therefore, remain in its contact position with the rim 13 of the opening on screwing up or unscrewing the lid 5 until it is lifted from the rim 13 of the opening.

In order to avoid the cap 5 being opened by careless pressure on the operating member 38 with a component of force in the direction of opening the cap 5, the cap 5 is provided in its closed position as shown with a catch that can be formed by a preferably releasable protection against torsion, for example in the form of a catch pin 52 in the protective housing 2, that dips into a depression in the cap 5 and overrides a pressure point, not shown, at the start of the opening movement of the cap 5.

Figure 2:
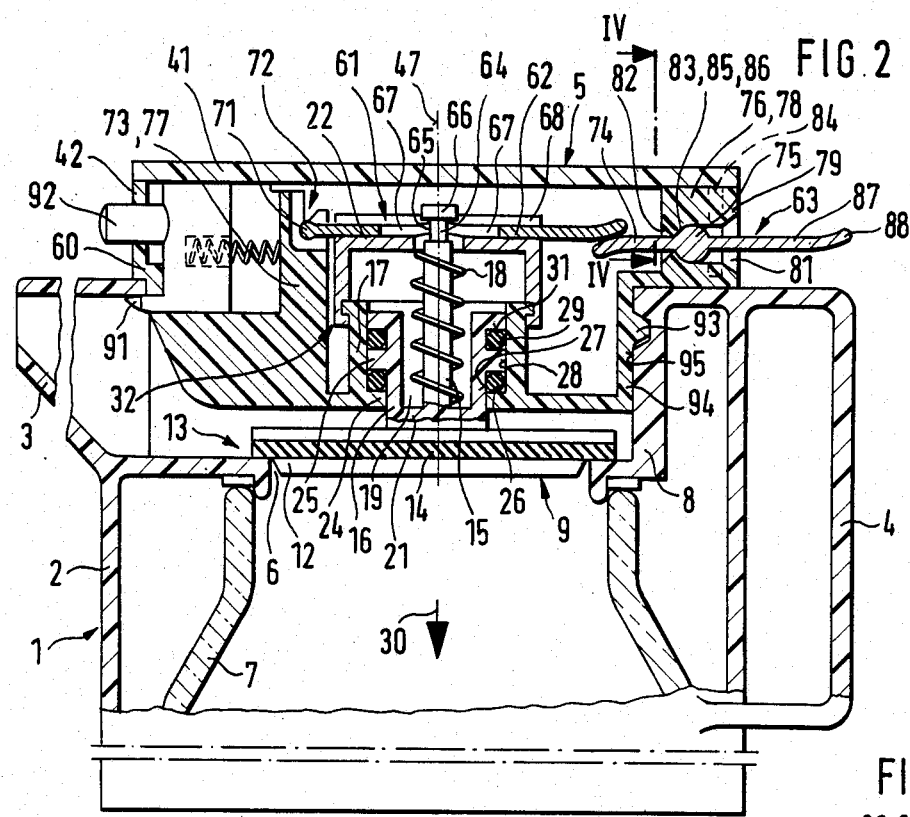
FIG. 2 shows an insulating jug in vertical section as a second embodiment.
Figure 3:
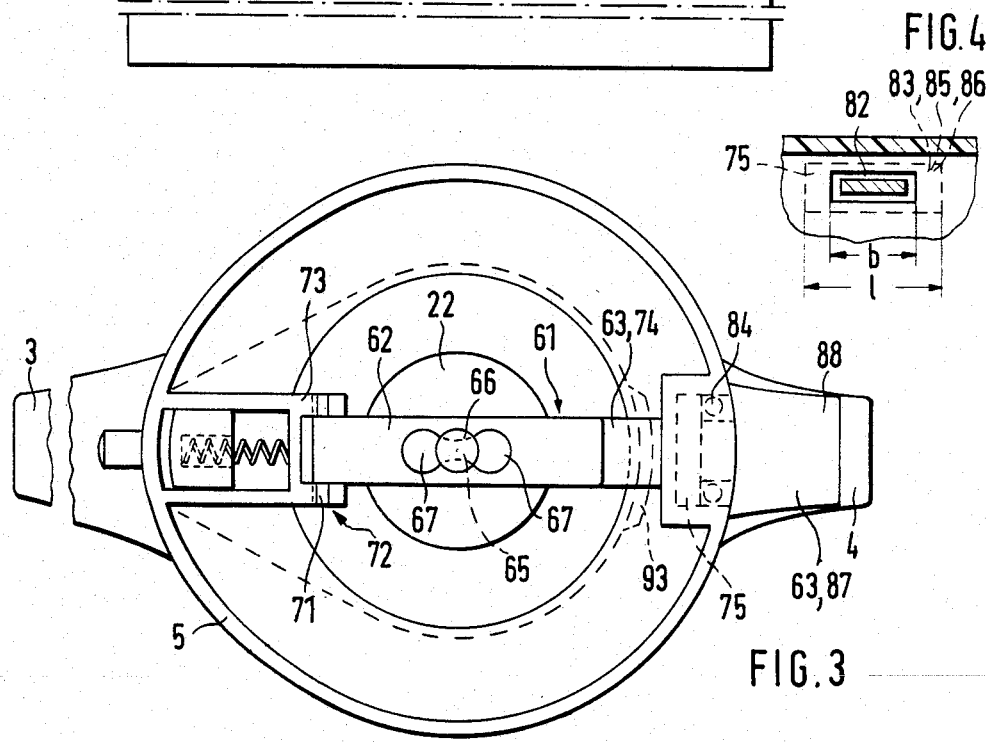
FIG. 3 shows the insulating jug according to FIG. 2 without its upper lid part from above.

In the second embodiment according to FIGS. 2 to 4, the cap 5 is a so-called catch cap, whose functioning will now be described.

The displacement mechanism in the second embodiment, indicated generally by 61, comprises a single-armed lever 62 and a two-armed lever 63. The single-armed lever 62 is connected in its middle region with the stem 15 in that it receives a narrowed section 64 of the stem 15 in a depression 65. The single-armed lever 62 is thus fixed along the axis 47 of the cap 5 and of the closure member 9 between a head 66 of the stem 15 and a shoulder (not shown). The depression 65 extends on both sides into enlarged openings 67, which enable the stem 15 to be easily and quickly inserted or removed. The single-armed lever 62 is received in a groove 68 in the upper side of the abutment 22 which, as in the case of the first embodiment, can be fixed to the outer guide cylinder 17 by a bayonet connection indicated generally by 32.

At one end of the single-armed lever 62 a horizontally extending pivot axis 71 is formed which is housed in outwardly opening mounting eyes 72 of a mounting 73 in the side of the cap. The mounting eyes 72 have catch edges (not shown in detail) in the region of a slot that is narrower than the pivot axis 71. With withdrawal of the pivot axis 71 from the mounting eyes 72, therefore, requires the exertion of a definite force. The free end of the single-armed lever 62 overlaps the inner arm 74 of the two-armed lever 63, which also has a pivot axis 75 by which it is mounted in a mounting 76 in a manner still to be described. Both the mounting 73 and the mounting 76 are formed in material extensions 77, 78 formed integrally on the inside of the cap 5.

The two-armed lever 63 passes through the wall 79 of the hollow cap 5 in a mounting pocket 81 connected inwardly with an opening 82 that is widened out above and below in the form of embrasures so as to obtain as large a bearing surface 83 as possible with an adequate pivoting angle. This arrangement makes it possible to insert the two-armed lever 63 from outside. The positioning of the pivot axis 75 on the bearing surface 83 is ensured by fixing pegs 84 which extend on the outside of the pivot axis 75 vertically into the extensions 78.

Figure 4:
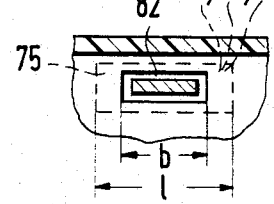
FIG. 4 shows a partial section along the line IV—IV in FIG. 2.

From FIG. 4 it can clearly be seen that the bearing surface 83 forms an annular sealing surface indicated by 85, which is made possible by the fact that the pivot axis 75 is longer (1) than the breadth b of the opening 82 and extends on both sides through the opening 82. This sealing surface 85 ensures a safe sealing of the opening 82 when the pivot axis 75 with its cylindrical outer surface 86 fits onto the bearing surface 83 and the sealing surface 85.

The outer arm 87 of the two-armed lever 63 forms a first operating member 88, by which the closure member 9 can be raised against the force of the pressure spring 18, and also opposite to the direction of closure 30, by vertical depression of the operating member 88. As soon as the operating member 88 is released, the pressure spring 18 forces the closure member 9 back into its closed position shown (direction of closure 30).

As in the first embodiment, the cap 5 in the second embodiment also consists of an upper cap part 41 and a lower cap part 42 that are fixed to one another in a manner not shown, for example by firmly locking, sticking or welding, either releasably or permanently. This enables the displacement mechanism 61 to be mounted and de-mounted in the hollow cap 5.

To remove the cap 5 from the insulating jug 1, a radially displaceable catch lug 91 on the pourer side must be pushed in by pressure on a button 92 and the cap 5 raised on the pourer side, so that a catch lug 93 on the grip side is freed and the cap 5, with its extension 94 underneath, can be removed from a depression 95 in the protective casing 2 that receives it.

Figure 5:
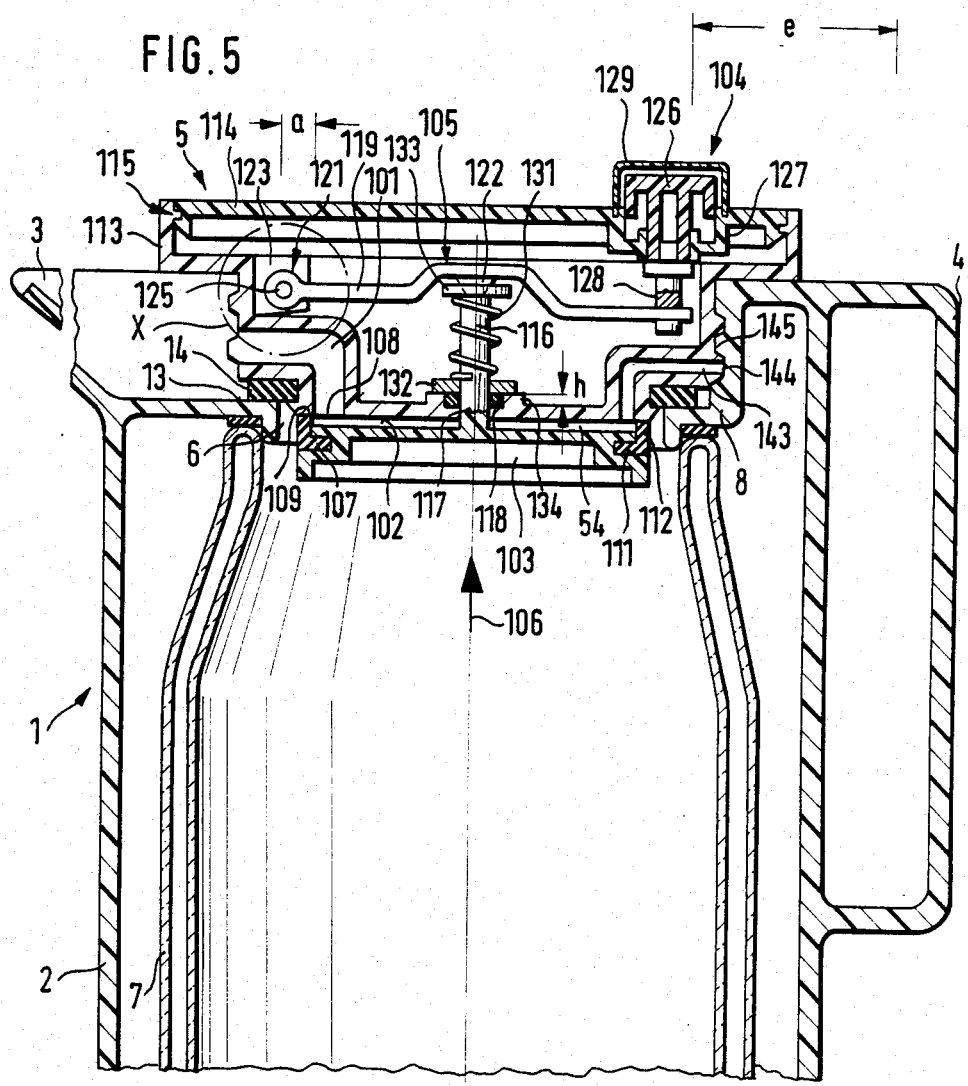
FIG. 5 shows an insulating jug in vertical section as a third embodiment.
Figure 6:
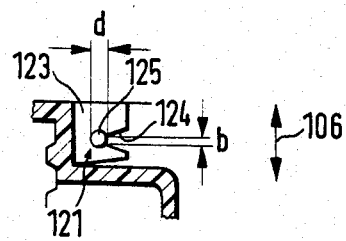
FIG. 6 shows a detail indicated by X in FIG. 5.
Figure 7:
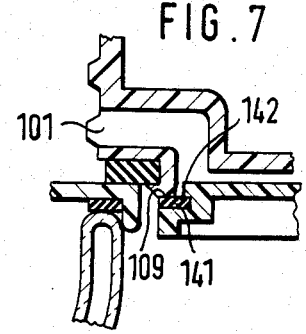
FIG. 7 shows another embodiment of a sealing arrangement for a pouring channel according to FIG. 5.

In the third embodiment according to FIGS. 5 to 7, the cap 5—as in the case of the first embodiment—is a so-called screw cap which can be unscrewed from above from the support 8, and in the position shown closes the opening 6 by means of a flat ring seal 14. The ring seal 14 then presses on the rim 13 of the opening.

A pouring channel 101 is arranged in the cap 5 around the seal of the opening 6, opening radially from the part of the cap 5 that is screwed into the support 8, on the side of the cap 5 facing the pourer 3, when this is in the closed position shown. The pouring channel 101 opens inwardly on the underside 102 of the cap 5. The pouring channel 101 can be opened and closed by means of a closure member 103 which can be opened and closed by means of an operating member on the cap 5 indicated generally by 104 and a displacement mechanism in the cap 5 indicated generally by 105.

The closure direction of the closure member 103, indicated by 106, is upwards and is thus opposite to the direction of closure in the first and second embodiments.

In the position shown, the closure member 103 is in its closed position, i.e. it fits onto the underside 102 of the cap 5 with a ring seal 107, so that the opening 108 of the pouring channel 101 is arranged within the ring seal 107.

It is important that the opening 108 is as close as possible to the side of the rim 13 of the opening that faces the pourer 3. FIG. 5 shows clearly that between the opening 108 and the rim 13 of the opening there is essentially only the sealing surface 109 required for the closure member. The arrangement of the opening 108 just described is important since the greater the distance a between the opening 108 and the rim 13 of the opening, the more difficult it is to pour out residual liquid from the insulating jug 1, because the degree to which the insulating jug 1 must be tipped in order to allow the residual liquid to run out increases with the distance a.

The annular seal 107 is angular in section and has a sealing web 111 fitting in an annular groove in the closure member 103 and an axially extending sealing web 112 which cooperates with the sealing surface 109 on the underside 102 of the cap 5. This design is both advantageous because the sealing web 112 forms a good seal, and also because it can be made relatively thin so that the distance a can be made as small as possible.

In the open position the closure member 103 is depressed to a certain extent, so that when the insulating jug 1 is appropriately tipped, the liquid can flow out around the closure member 103 and through the pouring channel 101.

The cap 5 is made hollow and consists of a lower cap part 113 and an upper cap part 114 which, as shown at 115, can be locked together to form a seal.

The closure member 103 passes through the lower part 113 of the cap with an intermediate stem 116 in a guide hole 117, behind which there is arranged a sealing ring 118 surrounding the stem 116, which seals off the hollow space.

The free end of the stem 116 cooperates with a single-armed lever 119 which extends diametrically into the hollow space and is mounted at one end so as to be vertically pivotable in a hinge 121 and is connected at its other end with the operating member 104. The free end of the stem 116 is carried on the lever 119 in the form of a thrust bearing. For this purpose a conical extension 122 on the lever 119 engages a correspondingly shaped depression on the face side of the stem 116. The converse arrangement is also possible.

The hinge 121 is formed with slots 124 in the side wall of the mounting 123 extending transversely to the direction of the main stress (closure direction 106), in which a pin 105 on the lever 119 can be clipped.

The operating member 104 is formed by a push rod 126, preferably round when viewed from above, which is guided vertically through the upper part of the cap 114, for example in a depression 127. The push rod 126 is connected by means of a fork-shaped connector 128 with the free end of the lever 119, with the connector 128 embracing the lever 119. In the region of the operating member 104 the hollow space of the cap 5 is sealed off by means of an elastic sealing cap 129, which is inserted as a seal in an annular groove in the upper part of the cap 14, or can be fastened in some other way onto the upper part 114 of the cap. The sealing cap 129, or, if the sealing cap 129 is transparent, the push rod 126, is preferably made in a color different from the color of the cap 5, preferably red.

The closure member 103 is pre-stressed by a pressure spring 131 in the direction of closure 106. The pressure spring 131 is arranged on the stem 116, supported at the lower end by means of a disk 132 on the lower part 113 of the cap and at the upper end on a shoulder 133 which is fixed to the stem 116 in a manner not shown. Because of the pre-stressing force of the pressure spring 131, the closure member 103 is pre-stressed against the sealing surface 109. Consequently, the lever 119 and the push rod 126 are also held in their closed position by the force of the pressure spring 131.

To open the pouring channel 101, the push rod 126 which is within finger reach e from the handle 4, is depressed by means of a finger, for example the thumb of the hand holding the insulating jug 1, so that the lever 119 is pivoted downwards and the closure member 103 is displaced downwards into the open position.

It is advantageous to provide the push rod 126 in its open position with a catch, not shown, which can be released by further pressure on the push rod 126, rather in the manner of a pressure rod mechanism (for e.g. ball point pens). With such a design, the closure member 103 can be kept in its open position without the need for continued pressure on the push rod 126. Only by further operation of the push rod 126 can the closure member 103 and thus the pouring channel 101 be closed again.

The sealing arrangement in the region of the sealing ring 118 is also important. Because of the fact that the pressure spring 131 loads the sealing ring 118, this is compressed, which causes a reduction in its internal diameter and thus a firmer grip on the stem 116. This sealing effect is increased by surrounding the sealing ring 118 by an annular projection 134 on the lower part of the cap, the height h of the annular projection 134 being smaller than the thickness of the unloaded sealing ring 118. The sealing ring 118 can thus only expand inwards.

In FIG. 7 an alternative form of sealing arrangement for sealing the pouring channel 101 is shown. Here a flat annular seal 141 is provided. So that this can cooperate with the sealing surface 109, the closure member 103 is recessed at 142.

So that air can be sucked into the interior of the jug during pouring, a ventilating channel 143 is provided opening on the side of the cap 5 opposite to the opening of the pouring channel 141. The external opening 144 of the ventilating channel 143 is in the region of the mounting 145. Here the opening 144 is not visible and is protective from coarse contamination.

It should also be stated that steam pressure occurring in the interior of the insulating jug 1 reinforces the closing action of the closure member 103, since the direction of closure 106 is directed upwards.

What is claimed is:

1. An insulating jug having a housing with a handle or like grip formed thereon; a connecting piece in the upper part of the housing; a hollow cap insertable into said connecting piece; a pourer formed on the housing; a pouring opening on said housing; a displaceable closure member having a guide stem, said closure member being arranged on the underside of the bottom of the cap; and a displacement mechanism with an operating member extending through the cap for vertically displacing said closure member between a closed and an open position; characterized in that a spring exerts a force on the closure member to pretension said closure member in the direction of the closed position; said displacement mechanism being actuatable to retain said closure member in the open position against the force of the spring, said operating member being automatically restorable to its closed position by the force of the spring, said operating member extending to within finger reach of the handle, the displacement mechanism and the spring being arranged in the hollow cap; a ring seal for sealing the guide stem in or on the inner side of the bottom of the cap; a stop for limiting the opening movement of the closure member, said stop comprising an annular extension projecting from the guide surface of a guide cylinder in the side of the cap; and a ring seal being arranged between the stop and a shoulder on the guide stem, said ring seal concurrently cooperating with a cylindrical surface of the guide stem and the guide surface of the guide surface in the side of the cap.

2. An insulating jug according to claim 1, characterized in that the closure member is arranged on the underside of the cap and is pre-tensioned downwardly by the spring.

3. An insulating jug according to claim 1, characterized in that the closure member cooperates with a pouring channel which extends in the cap from the underside of the cap to the side facing the pourer or the like.

4. An insulating jug according to claim 3, characterized in that the closure member is arranged on the underside of the cap and that the closure movement is directed upwards.

5. An insulating jug according to claim 1, characterized in that the closure member has a stem which passes through the bottom of said hollow cap and that the spring is arranged within the interior of the cap.

6. An insulating jug according to claim 1, characterized in that the operating member of the displacement mechanism is brought out sideways from the cap.

7. An insulating jug according to claim 1, characterized in that the operating member dips into an opening on the upper side of the cap situated on the side of the cap opposite the pouring channel and the pourer.

8. An insulating jug according to claim 1, characterized in that the displacement mechanism comprises a lever which acts indirectly or directly on the closure member.

9. An insulating jug according to claim 8, characterized in that the lever has two arms of which the shorter arm acts indirectly or directly on the closure member.

10. An insulating jug according to claim 8, characterized in that the lever cooperates with the inner arm of a second two-armed lever mounted near the perimeter of the cap which passes through the aperture and whose outer arm forms the operating member.

11. An insulating jug according to claim 1; characterized in that the closure member is rotatable around its axis and is detachably connected to the guide stem.

12. An insulating jug according to claim 1, characterized by an elastic seal for sealing an opening on the side of the cap, said operating member for the displacement mechanism extending through the opening in the cap.

13. An insulating jug according to claim 1, characterized in that the cap comprises an upper cap portion and a lower cap portion, and the joint between said cap portions extends through the opening for the operating member in the cap.

* * * * *